US009372572B2

(12) United States Patent
Wei et al.

(10) Patent No.: US 9,372,572 B2
(45) Date of Patent: Jun. 21, 2016

(54) TOUCH LOCATING METHOD AND OPTICAL TOUCH SYSTEM (71) Applicant: Wistron Corporation, New Taipei (TW)

(72) Inventors: Shou-Te Wei, New Taipei (TW); Shang-Chin Su, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 20 days.

(21) Appl. No.: 14/246,137

(22) Filed: Apr. 6, 2014

(65) Prior Publication Data
US 2015/0145829 A1 May 28, 2015

(30) Foreign Application Priority Data
Nov. 27, 2013 (TW) .............................. 102143285 A (51) Int. Cl.
*G06F 3/00* (2006.01)
*G06F 3/041* (2006.01)
*G06F 3/042* (2006.01)
*G06F 3/0354* (2013.01)

(52) U.S. Cl.
CPC .......... *G06F 3/0416* (2013.01); *G06F 3/03545* (2013.01); *G06F 3/0428* (2013.01)

(58) Field of Classification Search
CPC ............ G06F 3/042; G06F 3/033; G06F 5/00
See application file for complete search history.

(56) References Cited

U.S. PATENT DOCUMENTS

| 2005/0073508 | A1* | 4/2005 | Pittel et al. ..................... 345/175 |
| 2010/0206645 | A1 | 8/2010 | Harel |
| 2012/0113057 | A1* | 5/2012 | Kobayashi ............ G06F 3/0421 |
| | | | 345/175 |
| 2013/0044081 | A1* | 2/2013 | Wu et al. ....................... 345/175 |

FOREIGN PATENT DOCUMENTS

| TW | 200832200 | 8/2008 |
| TW | 201310306 | 3/2013 |

OTHER PUBLICATIONS

Office action mailed on Mar. 25, 2015 for the Taiwan application No. 102143285, filing date: Nov. 27, 2013, p. 1 line 1-14, p. 2-6 and p. 7 line 1-24.

* cited by examiner

*Primary Examiner* — Michael Faragalla
(74) *Attorney, Agent, or Firm* — Winston Hsu; Scott Margo (57) ABSTRACT

A locating method for an optical touch system determines a center position of an indication object on a touch area of the optical touch system by an optical location means. The locating method determines a light-emitting position of a light emitter of the indication object on the touch area by receiving indication light emitted from the light emitter by two optical sensors. The locating method determines a touch position and a touch direction according to a relative relationship between the center position and the light-emitting position; therein, the touch position can be regarded as a touch point on the touch area by the indication object, and the touch direction can be regarded as a rotation angle of the indication object relative to the touch area.

16 Claims, 11 Drawing Sheets

TOUCH LOCATING METHOD AND OPTICAL TOUCH SYSTEM

BACKGROUND OF THE INVENTION

1. Field of the Invention

The invention relates to a touch system, and especially relates to an optical touch system and a touch locating method thereof.

2. Description of the Prior Art

Conventional optical touch systems of single touch or multi-touch only can determine a touch position on a touch screen for a single touch point, such as a center position of a touch pen touching the touch screen. If a rotation angle needs to be inputted simultaneously, it has to be done separately such as by a keyboard or a trackball. It is quite inconvenient. Therefore, there is a need for enhancing the input function of the touch pen for facilitating inputting more data simultaneously to users.

SUMMARY OF THE INVENTION

An objective of the invention is to provide a touch locating method, which can provide a locating function of a touch position and a touch direction to a single touch operation.

The touch locating method of the invention is used for locating a touch position and a touch direction of an indication object on a touch area of an optical touch system. The indication object has an outer surface and a light emitter. The optical touch system includes a first optical sensor and a second optical sensor disposed at a circumference of the touch area. The touch locating method includes using the first optical sensor and the second optical sensor to determine a center position of the indication object on the touch area by an optical location means. The touch locating method includes making the light emitter emit an indication light out of the outer surface and using the first optical sensor and the second optical sensor to receive the indication light so as to determine a light-emitting position of the light emitter on the touch area. Afterward, the touch locating method includes determining the touch position and the touch direction according to a relative relationship between the center position and the light-emitting position. In practice, the touch locating method can determine a vector according to the relative relationship between the center position and the light-emitting position. The vector is from the center position to the light-emitting position. A direction of the vector is regarded as the touch direction while the center position is regarded as the touch position.

Another objective of the invention is to provide an optical touch system using the touch locating method of the invention. The optical touch system includes a touch area, a touch pen, a first optical sensor, a second optical sensor, and a processing module. The touch pen is used for performing a touch operation on the touch area. The touch pen has an outer surface and a light emitter. The light emitter is used for emitting an indication light out of the outer surface. The first optical sensor is disposed at a first corner of a circumference of the touch area. The second optical sensor is disposed at a second corner of the circumference. The processing module is electrically connected to the first optical sensor and the second optical sensor. The processing module uses the first optical sensor and the second optical sensor to determine a center position of the touch pen on the touch area by an optical location means, uses the first optical sensor and the second optical sensor to receive the indication light so as to determine a light-emitting position of the light emitter on the touch area, and determines a touch position and a touch direction of the touch pen on the touch area according to a relative relationship between the center position and the light-emitting position. According to the touch locating method of the invention, in practice, the processing module can determine a vector according to the relative relationship between the center position and the light-emitting position. The vector is from the center position to the light-emitting position. A direction of the vector is regarded as the touch direction while the center position is regarded as the touch position.

In sum, the invention uses the light emitter on the indication object (e.g. a touch pen) to provide additional position information of the indication object to be calculated with the touch position of the indication object, and then can provide a touch direction of the indication object. Compared with the prior art, the invention can use only one indication object to provide more touch information (including a touch position and a touch direction) based on one touch, which enhances the input function of the touch pen for performing touch input efficiently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
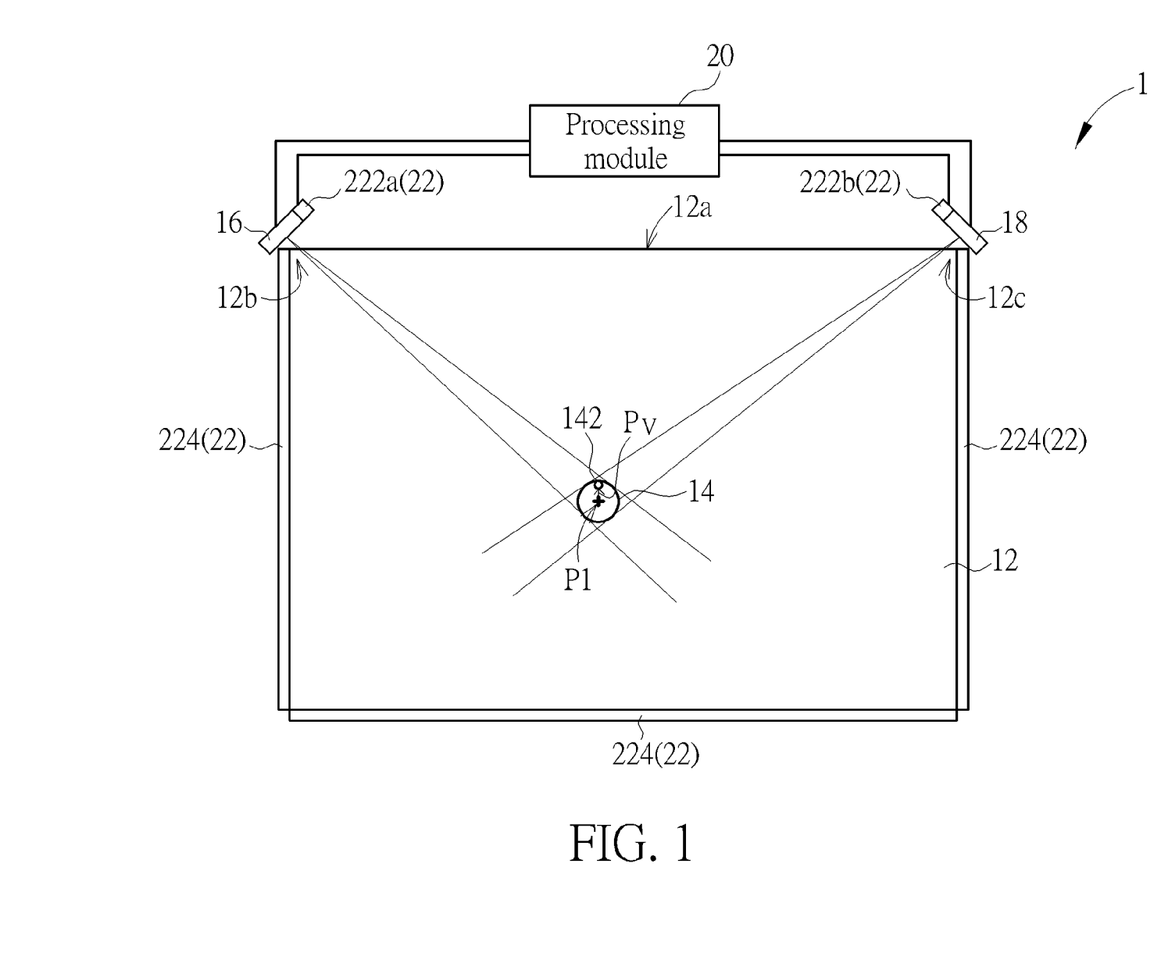
FIG. 1 is a schematic diagram illustrating an optical touch system of a preferred embodiment according to the invention.
Figure 2:
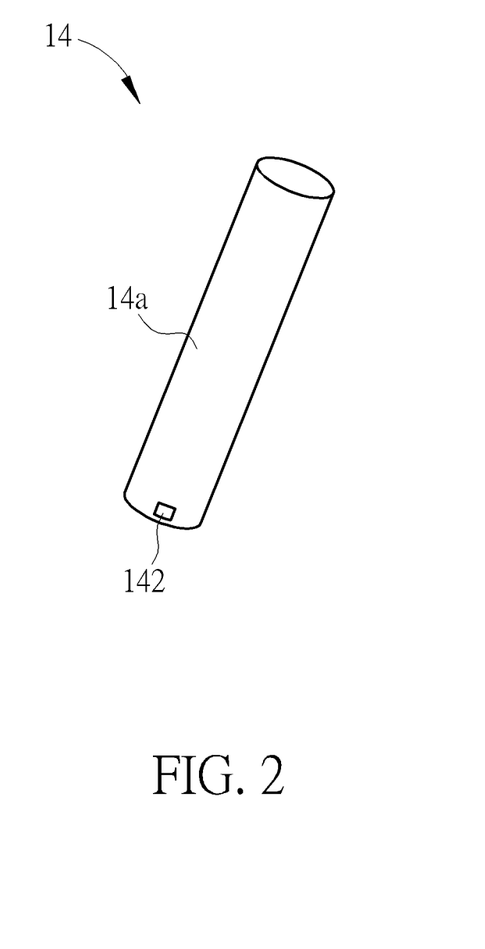
FIG. 2 is a schematic diagram illustrating a touch pen of the optical touch system in FIG. 1.

Please refer to FIG. 1, which is a schematic diagram illustrating an optical touch system 1 of a preferred embodiment according to the invention; therein, for illustration convenience, some components of the optical touch system 1 are shown exaggeratedly. The optical touch system 1 includes a touch area 12, an indication object (e.g. a touch pen 14, shown by a circle in FIG. 1), a first optical sensor 16, a second optical sensor 18, a processing module 20, and a light generation module 22. In practice, the touch area 12 can be an area defined on a display screen. The touch pen 14 is used for performing a touch operation on the touch area 12. The first optical sensor 16 is disposed at a first corner 12b of a circumference 12a of the touch area 12. The second optical sensor 18 is disposed at a second corner 12c of the circumference 12a of the touch area 12. The processing module 20 is electrically connected to the first optical sensor 16 and the second optical sensor 18. The light generation module 22 includes two light-emitting sources 222a and 222b and an optical reflection structure 224. The light-emitting sources 222a and 222b are disposed beside the first optical sensor 16 and the second optical sensor 18 respectively and emit light toward the touch area 12. The optical reflection structure 224 such as a plurality of reflection sheets disposed on the circumference 12a of the touch area 12 can reflect the light emitted by the light-emitting sources 222a and 222b. Please also refer to FIG. 2, which is a schematic diagram illustrating the touch pen 14. The touch pen 14 has an outer surface 14a and a light emitter 142. The light emitter 142 is disposed close to the front end of the touch pen 14 (i.e. the portion for touch the touch area 12). The light emitter 142 is used for emitting an indication light out of the outer surface 14a; in the embodiment, it is achieved by exposing the light emitter 142 out of the outer surface 14a. The first optical sensor 16 and the second optical sensor 18 can receive the light from the light-emitting sources 222a and 222b and the indication light and generate light signals. The light signals are then transmitted to the processing module 20 for processing.

Figure 3:
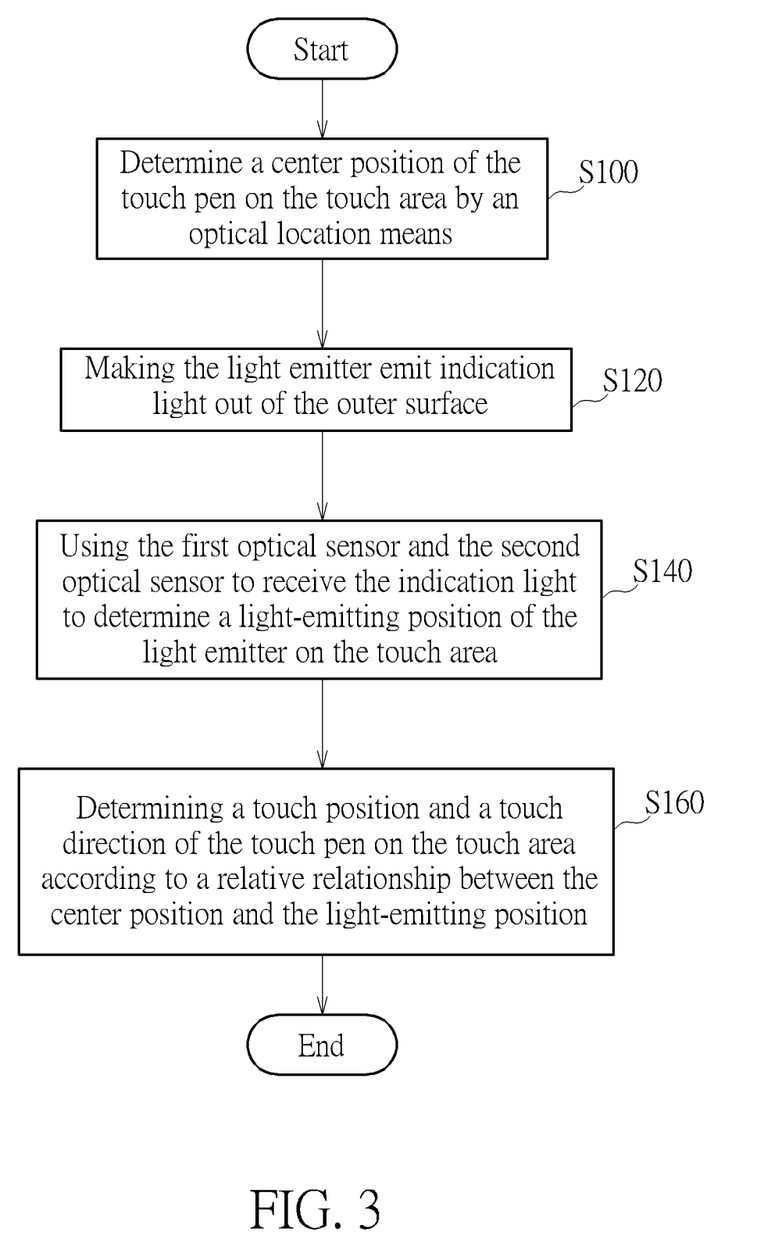
FIG. 3 is a flow chart of a touch locating method according to the invention.

Please refer to FIG. 3, which is a flow chart of a touch locating method according to the invention. Take the optical touch system 1 as an example, when a user uses the touch pen 14 to perform a touch operation on the touch area 12, the touch locating method includes using the processing module 20 to determine a center position P1 (indicated by a cross mark in FIG. 1) of the touch pen 14 on the touch area 12 by an optical location means, as shown by the step S100. In practice, the optical location means is using images relative to the touch pen 14 captured by the first optical sensor 16 and the second optical sensor 18 to determine the center position P1 of the touch pen 14 by but not limited to triangulation. The touch locating method includes making the light emitter 142 emit indication light out of the outer surface 14a, as shown by the step S120. In practice, the light emitter 142 can continuously emit light or be wire or wireless controlled to emit light by the processing module 20, but the invention is not limited thereto. The touch locating method includes the processing module 20 using the first optical sensor 16 and the second optical sensor 20 to receive the indication light to determine a light-emitting position P2 (indicated by a small circle in FIG. 1) of the light emitter 142 on the touch area 12, as shown by the step S140. The touch locating method includes the processing module 20 determining a touch position and a touch direction of the touch pen 14 on the touch area 12 according to a relative relationship between the center position P1 and the light-emitting position P2, as shown by the step S160. In practice, in the step S160, the touch locating method includes the processing module 20 determining a vector Pv (indicated by an arrow in FIG. 1) according to the relative relationship between the center position P1 and the light-emitting position P2. For example, the vector Pv is defined from the center position P1 pointing to the light-emitting position P2. The direction of the vector Pv is regarded as the touch direction, and the center position P1 is regarded as the touch position. However, the invention is not limited thereto.

Figure 4:
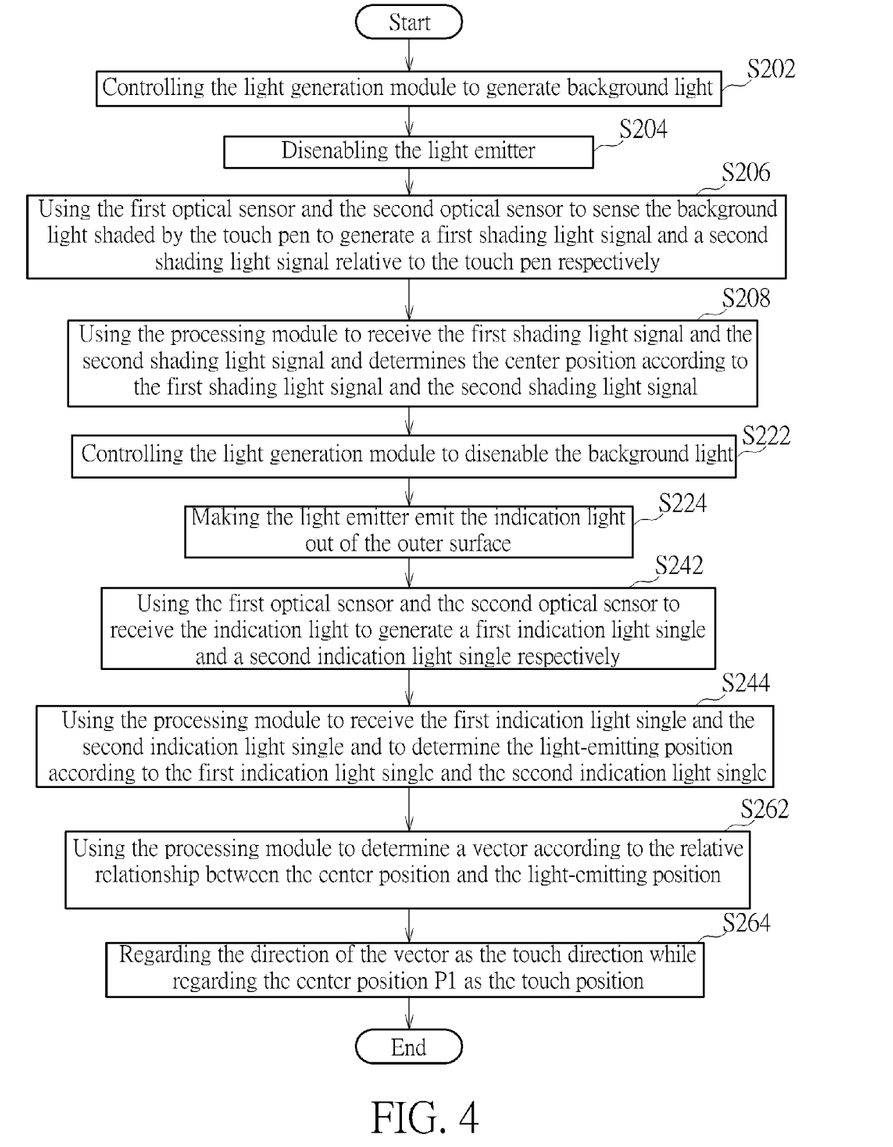
FIG. 4 is a flow chart of the touch locating method for the optical touch system in FIG. 1 according to an embodiment of the invention.

In the embodiment, the optical location means for the optical touch system 1 is determining two angles of the touch pen 14 relative to the first optical sensor 16 and the second optical sensor 18 respectively according to light shading by the touch pen 14, so as to determine the center position P1 of the touch pen 14. Therefore, in an embodiment, the follow chart of the touch locating method for the optical touch system 1 can be shown by FIG. 4. The touch locating method includes controlling the light generation module 22 to generate background light, as shown by the step S202. The background light is formed by light emitted from the light-emitting sources 222a and 222b toward the touch area 12 and reflected by the optical reflection structure 224. In practice, the light generation module 22 can generate the background light by other ways, for example by disposing a light-guiding structure on the circumference 12a of the touch area 12 and using one or more light sources to emit light which enters a light-guiding structure through an incident surface thereof and emits out of the light-guiding structure through a light-emitting surface thereof toward the touch area 12 for the background light.

In practice, for avoiding influence by the indication light emitted by the light emitter 142 on the determination of the center position P1 of the touch pen 14, in the embodiment, the touch locating method includes disenabling the light emitter 142, as shown by the step S204. Therein, the disenabling the light emitter 142 can be achieved by the processing module 20 wire or wireless controlling the light emitter 142 to emit light. Afterward, the touch locating method includes using the first optical sensor 16 and the second optical sensor 18 to sense the background light shaded by the touch pen 14 to generate a first shading light signal and a second shading light signal relative to the touch pen 14 respectively, as shown by the step S206. The processing module 20 receives the first shading light signal and the second shading light signal and determines the center position P1 according to the first shading light signal and the second shading light signal, as shown by the step S208. Further, please refer to FIG. 5, which is a schematic diagram illustrating the determining of the center position P1 of the touch pen 14; therein, the touch pen 14 is shown exaggeratedly by a circle in the figure. The first shading light signal generated by the first optical sensor (such as but not limited to a CMOS camera) can be taken as a distribution of light intensity (vertical axis) to pixel (horizontal axis); therein, pixel positions correspond to receiving angles of the first optical sensor 16. The corresponding method is well-known by a person skilled in the art and will not be described herein. The first shading light signal includes a region of lower light intensity. An angle range corresponding to the region is an angle range of the touch pen 14 shading the background light which is indicated by two thin solid tangent lines to the circle (i.e. the touch pen 14) in FIG. 5. In the embodiment, the touch pen 14 is made in form of a column, so a median value (i.e. pixel position) of the region can be regarded as an angle 162 corresponding to the center position P1, which is indicated by a dashed line in FIG. 5. The above description also can be applied to the second optical sensor 18 and will not be repeated for the second optical sensor 18 in addition. Similarly, the second shading light signal generated by the second optical sensor 18 also includes a region of lower light intensity. A median value of the region can be regarded as an angle 182 corresponding to the center position P1, which is also indicated by a dashed line in FIG. 5. An intersection of the two dashed lines can be defined as the center position P1. By trigonometric geometric relations, the coordinates of the center position P1 can be calculated out for the system.

The above steps S202, S204, S206 and S208 are an embodiment of the step S100 in FIG. 3. Please refer back to FIG. 4. The touch locating method includes controlling the light generation module 22 to disenable the background light, as shown by the step S222; making the light emitter 142 emit the indication light outer surface 14a, as shown by the step S224. In practice, the disenabling of the light generation module 22 and the light emitting of the light emitter 142 can be controlled by the processing module 20 through the communication connection of the processing module 20 with the light generation module 22 and the light emitter 142. Please refer to FIG. 5. At the moment, the background light has been disenabled, and the first optical sensor 16 and the second optical sensor 18 receive the indication light. Therefore, the touch locating method includes then using the first optical sensor 16 and the second optical sensor 18 to receive the indication light to generate a first indication light single and a second indication light single respectively, as shown by the step S242; using the processing module 20 to receive the first indication light single and the second indication light single and to determine the light-emitting position P2 according to the first indication light single and the second indication light single, as shown by the step S244. Further, similar to the above description about the first shading light signal, the first indication light single also can be taken as a distribution of light intensity (vertical axis) to pixel (horizontal axis); therein, pixel positions correspond to receiving angles of the first optical sensor 16. The first indication light single includes a peak of higher light intensity (or a narrow region of higher light intensity). A pixel position corresponding to the peak can be regarded as an angle 164 (or a receiving angle) of the first optical sensor 16 receiving the indication light emitted by the light emitter 142 (shown by a smaller circle in FIG. 5), which is indicated by a chained line in FIG. 5. The chained line passes through the light emitter 142. The above description can be applied to the second optical sensor 18 and will not be repeated for the second optical sensor 18 in addition. Similarly, the second indication light single generated by the second optical sensor 18 also includes a peak of higher light intensity (or a narrow region of higher light intensity). A pixel position corresponding to the peak can be regarded as an angle 184 of the second optical sensor 18 receiving the indication light, which is also indicated by a chained line in FIG. 5. An intersection of the two chained lines can be defined as the light-emitting position P2 (i.e. the position of the smaller circle in FIG. 5). By trigonometric geometric relations, the coordinates of the light-emitting position P2 can be calculated out for the system.

The above steps S242 and S244 are an embodiment of the step S140 in FIG. 3. After obtaining the center position P1 and the light-emitting position P2, the touch locating method includes using the processing module 20 to determine a vector Pv (indicated by an arrow from the center position P1 pointing to the light-emitting position P2 in FIG. 5) according to the relative relationship between the center position P1 and the light-emitting position P2, as shown by the step S262. The direction of the vector Pv is regarded as the touch direction while the center position P1 is regarded as the touch position, as shown by the step S264. The above steps S262 and S264 are an embodiment of the step S160 in FIG. 3.

Compared with the prior art, the touch locating method of the invention can provide the user being capable of easily inputting two data at the same time (such as the touch position and the touch direction mentioned above) just by using single indication object (such as the above touch pen 14), which enhances the flexibility and variety of touch operation for performing touch input efficiently. For example, the touch position can be taken as a basis for determining a position of a displayed object; the touch direction can be taken as a basis for determining a rotation angle or direction of a displayed object. However, the invention is not limited thereto.

It is added that the description of the above embodiments is based on the touch operation of single touch. But in practice, the touch locating method of the invention can be performed repeatedly for obtaining successive input information. For such case, the touch locating method further includes using the processing module 20 to control the light generation module 22 to periodically generate the background light in a frequency, and using the processing module 20 to control the light emitter 142 to emit the indication light alternatively with the light generation module 22. That is, the touch locating method uses the processing module 20 to simultaneously control the light generation module 22 and the light emitter 142 to emit the background light and the indication light periodically and alternately in the frequency. Thereby, the background light and the indication light are emitted periodically and alternately in the frequency. In each interval which the background light or the indication light functions, the step for determining the center position P1 or the vector Pv is performed respectively, so as to obtain successive input information for enhancing the input variety. The detail for the determining steps is described above and will not be repeated herein.

Figure 6:
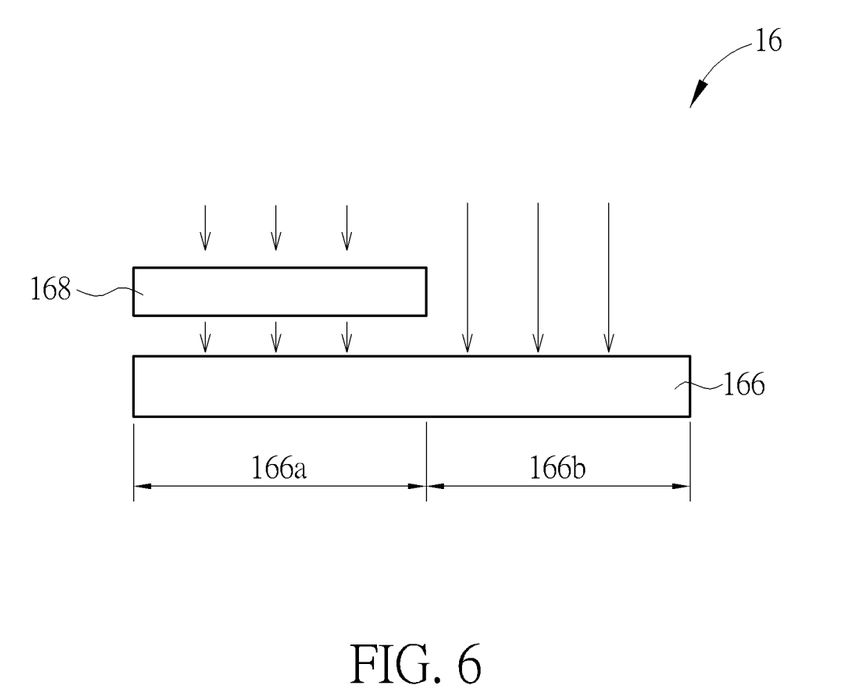
FIG. 6 is a schematic diagram illustrating a first optical sensor according to an embodiment.

In addition, if an intensity of light emitted by the light emitter 142 and an intensity of the background light are obviously distinct from each other, even though light signals received by the first optical sensor 16 and the second optical sensor 18 include information of both the background light and the indication light, the processing module 20 still can determine the coordinates of the center position P1 and the light-emitting position P2 from of the light signals. In such case, the above steps S204 and S222 can be omitted. It is added more that if the light emitter 142 and the light-emitting sources 222a and 222b emit light in different frequencies, the first optical sensor 16 and the second optical sensor 18 can be provided with an optical filter in front for filtering light. By the filtering of the optical filter, the first optical sensor 16 and the second optical sensor 18 can selectively receive the background light and the indication light for determining the center position P1 and the light-emitting position P2. For example, as shown by FIG. 6, the first optical sensor 16 includes a CMOS (complementary metal-oxide-semiconductor) optical sensor 166 and an optical filter 168. The optical filter 168 only covers a first portion 166a of the CMOS optical sensor 166. The optical filter 168 can be an optical lens capable of filtering out light within a certain wavelength range or allowing light within a certain wavelength range to pass through, that is, which performs selectively transmitting the indication light or the background light. For example, the optical filter 168 can filter out light emitted by the light emitter 142, so that the first portion 166a of the CMOS optical sensor 166 can receive only the background light. For another example, the optical filter 168 can allow light emitted only by the light emitter 142 to pass through, so that the first portion 166a of the CMOS optical sensor 166 only can receive the indication light. In FIG. 6, a second portion 166b of the CMOS optical sensor 166 can receive the background light and the indication light. Light signal containing the indication light or the background light can be retrieved from a light signal generated by the second portion 166b by a proper algorithm, for example, by subtracting a light signal generated by the first portion 166a from a light signal generated by the second portion 166b. It is added that in practice, the first optical sensor 16 can further include another optical filter for covering the second portion 166b so that the first portion 166a and the second portion 166b can only receive the background light and the indication light respectively. Thereby, the touch locating method can determine the center position P1 and the light-emitting position P2 at the same time, so as to increase a location frequency and make the touch operation smooth. The above description is also applied to the second optical sensor 18 and will not be repeated herein.

Figure 7:
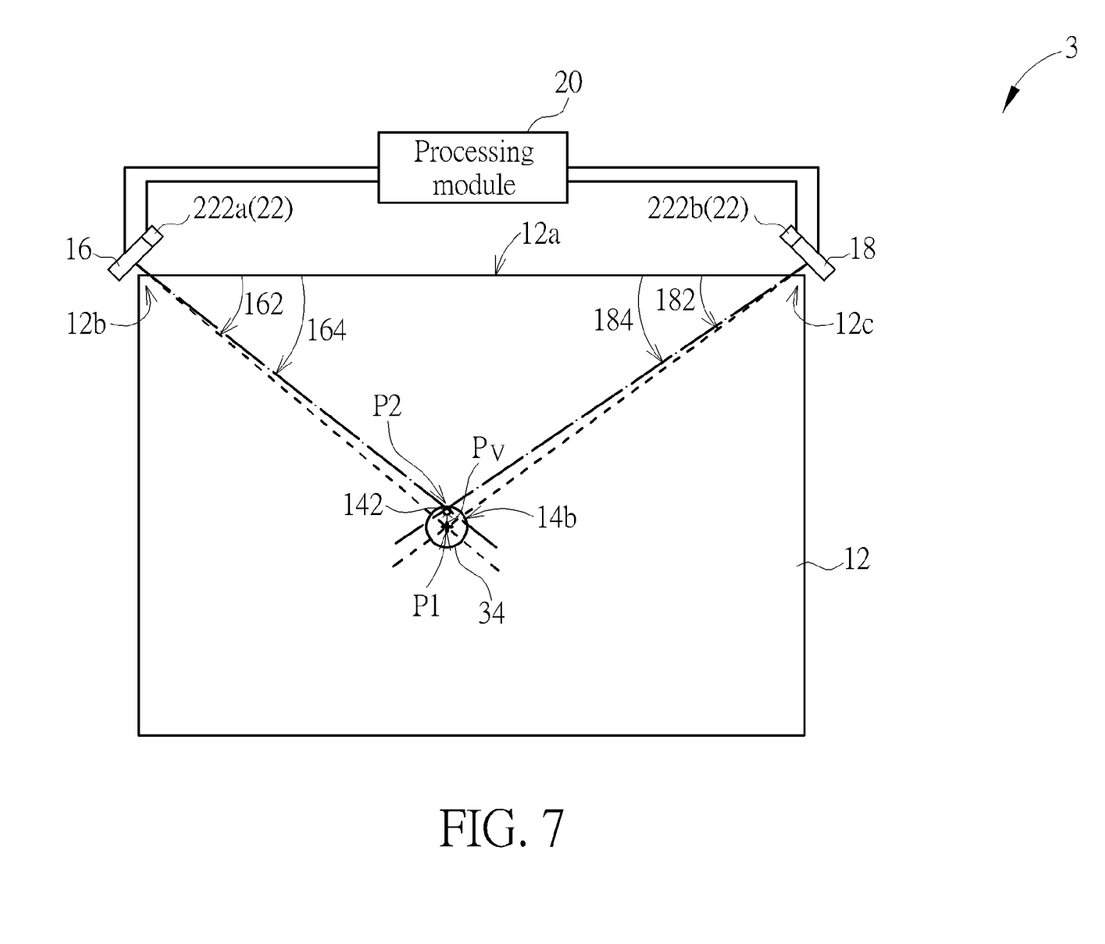
FIG. 7 is a schematic diagram illustrating an optical touch system of another embodiment according to the invention.
Figure 8:
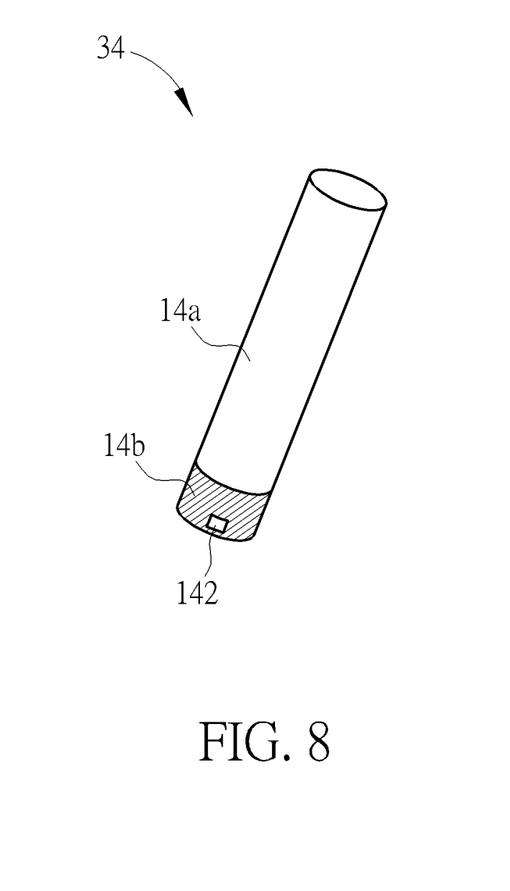
FIG. 8 is a schematic diagram illustrating a touch pen of the optical touch system in FIG. 7.

In the above embodiment, the optical touch system 1 determines the center position P1 by light covering, but the invention is not limited thereto. Please refer to FIG. 7, which is a schematic diagram illustrating an optical touch system 3 of another embodiment according to the invention. Therein, the optical touch system 3 and the optical touch system 1 are structurally similar, so the optical touch system 3 still uses notations used in the optical touch system 1. For relational descriptions about components of the optical touch system 3, please refer to relational description of the optical touch system 1, which will not be repeated in addition. In the embodiment, the main difference of the optical touch system 3 is that the optical location means for the optical touch system 3 is using light reflected by the touch pen 34 to determine angles of the touch pen 34 relative to the first optical sensor 16 and the second optical sensor 18 respectively, so as to determine the center position P1 of the touch pen 34. Please also refer to FIG. 8. FIG. 8 is a schematic diagram illustrating the touch pen 34. Compared with the touch pen 14, the touch pen 34 further includes a reflective area 14b (shown by hatched lines) on the outer surface 14a. The reflective area 14b surrounds the front end portion (i.e. the portion for touching the touch area 12) of the touch pen 34. The light emitter 142 is located within the reflective area 14b. Therefore, in the optical touch system 3, the light generation module 22 does not include the optical reflection structure 224. Light emitted by the light-emitting sources 222a and 222b is directly reflected by the reflective area 14b. The first optical sensor 16 and the second optical sensor 18 receive the reflected light and generate a light signal. The light signal is then transmitted to the processing module 20 for processing.

Figure 9:
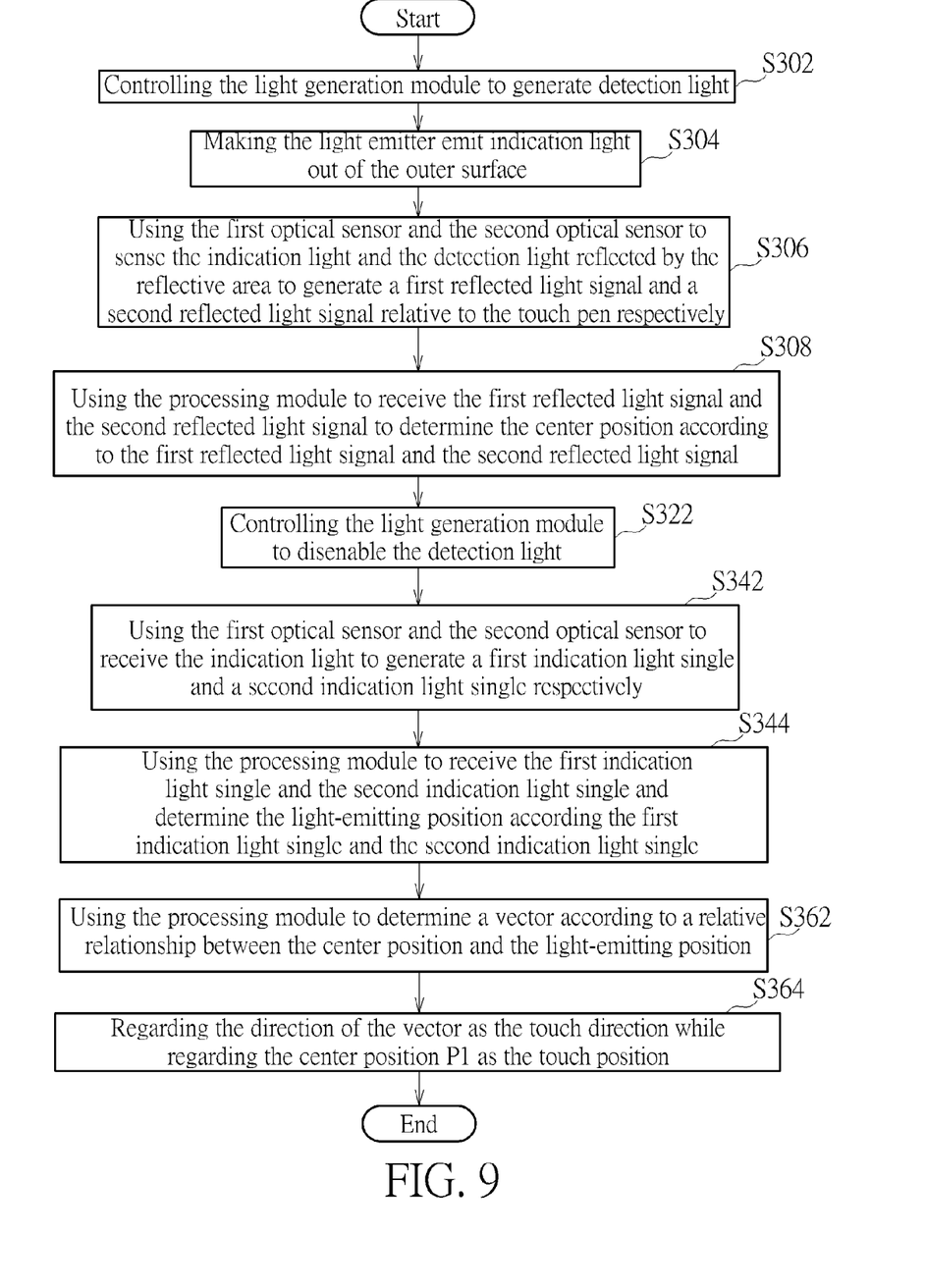
FIG. 9 is a flow chart of the touch locating method for the optical touch system in FIG. 7 according to an embodiment of the invention.

In an embodiment, a flow char of the touch locating method for the optical touch system 3 is shown by FIG. 9. The touch locating method includes controlling the light generation module 22 to generate detection light, as shown by the step S302. Because the light emitter 142 is also located within the reflective area 14b, the area occupied by the light emitter 142 may reduce the intensity of the detection light reflected by the reflective area 14b. Hence, in the embodiment, the touch locating method includes making the light emitter 142 emit indication light outer surface 14a for compensating the reduced intensity of the reflected detection light, as shown by the step S304. But the invention is not limited thereto. For example, if the reduced intensity can be ignored, the light emitter 142 can be disenabled. Afterward, the touch locating method includes using the first optical sensor 16 and the second optical sensor 18 to sense the indication light and the detection light reflected by the reflective area 14b to generate a first reflected light signal and a second reflected light signal relative to the touch pen 34 respectively, as shown by the step S306; using the processing module 20 to receive the first reflected light signal and the second reflected light signal to determine the center position P1 according to the first reflected light signal and the second reflected light signal, as shown by the step S308. Therein, because the optical touch system 3 uses the optical location means of reflecting light, the first reflected light signal shows a signal distribution of light intensity (vertical axis) to pixel (horizontal axis) which includes a peak of higher light intensity (or a narrow region of higher light intensity) directly corresponding to the angle 162 (referring to the dashed line in FIG. 7) of the center position P1. It is unnecessary to find out a reflected light signal region for calculating a median value of the region (which is similar to the location mechanism of the center position P1 for the optical touch system 1). The above description is also applied to the second reflected light signal and will not be repeated herein. Similarly, the touch locating method in the embodiment determines angles 162 and 182 (indicated by the two dashed lines in FIG. 7). The intersection of the two dashed lines can be defined as the center position P1. By trigonometric geometric relations, the coordinates of the center position P1 can be calculated out for the system.

The above steps S302, S304, S306 and S308 are an embodiment of the step S100 in FIG. 3. Please refer back to FIG. 9. The touch locating method includes controlling the light generation module 22 to disenable the detection light, as shown by the step S322. At the moment, the light emitter 142 keeps in emitting the indication light. Afterward, the touch locating method includes using the first optical sensor 16 and the second optical sensor 18 to receive the indication light to generate a first indication light single and a second indication light single respectively, as shown by the step S342; using the processing module 20 to receive the first indication light single and the second indication light single and determine the light-emitting position P2 according the first indication light single and the second indication light single, as shown by the step S344. For sensing the indication light and determining the light-emitting position P2, please refer to the description about the steps S222, S242 and S244, which will not be described in addition. After the center position P1 and the light-emitting position P2 are obtained, the touch locating method includes using the processing module 20 to determine a vector Pv (indicated by an arrow in FIG. 5 from the center position P1 to the light-emitting position P2) according to a relative relationship between the center position P1 and the light-emitting position P2, as shown by the step S362. The direction of the vector Pv is regarded as the touch direction while the center position P1 is regarded as the touch position, as shown by the step S364.

Similarly, the touch locating method in the embodiment also has the effect of the touch locating method for the optical touch system 1, which will not be described herein. It is added that the touch locating method for the optical touch system 3 also can be performed repeatedly for obtaining successive input information. In such case, the touch locating method further includes using the processing module 20 to control the light generation module 22 to periodically generate the detection light in a frequency, while the light emitter 142 keeps in emitting light. When the detection light is present, light signals generated by the first optical sensor 16 and the second optical sensor 18 are used for determining the center position P1; when the detection light is absent, light signals generated by the first optical sensor 16 and the second optical sensor 18 are used for determining the light-emitting position P2. Thereby, the touch locating method in the embodiment also can provide successive inputting, enhancing input variety.

It is added that similar to the touch locating method for the optical touch system 1, when the light emitter 142 and the light-emitting sources 222a and 222b of the optical touch system 3 emit light in different frequencies, the first optical sensor 16 and the second optical sensor 18 can be provided with an optical filter in front for filtering light. By the filtering of the optical filter, the first optical sensor 16 and the second optical sensor 18 can selectively receive the background light and the indication light for determining the center position P1 and the light-emitting position P2. The practice description can refer to FIG. 6 and relational descriptions, which will not be repeated herein. In sum, the first portion 166a and the second portion 166b of the CMOS optical sensor 166 receive different light. The processing module 20 receives light signals generated by the first portion 166a and the second portion 166b and determines the center position P1 and the light-emitting position P2 according to the light signals. Thereby, the touch locating method can determine the center position P1 and the light-emitting position P2 at the same time so as to increase a location frequency and make the touch operation smooth.

Figure 5:
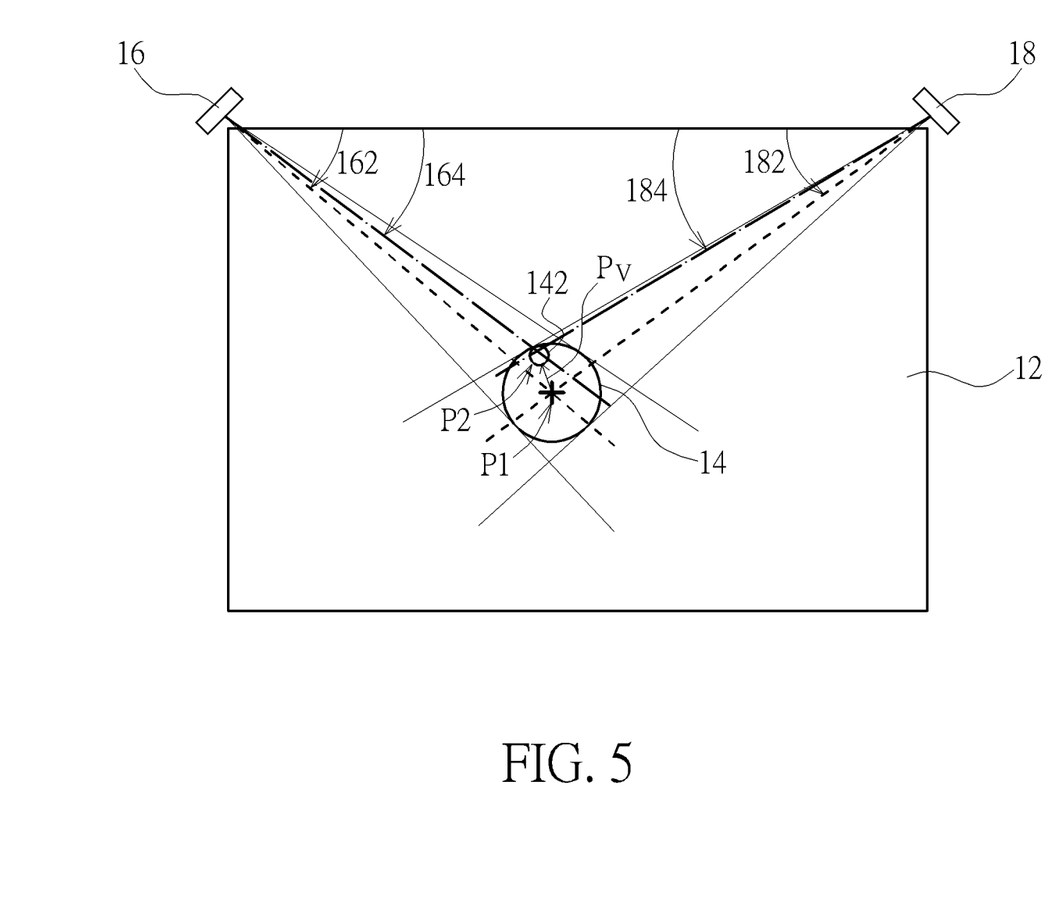
FIG. 5 is a schematic diagram illustrating the determining of the center position of the touch pen according to the touch locating method of FIG. 4.
Figure 10:
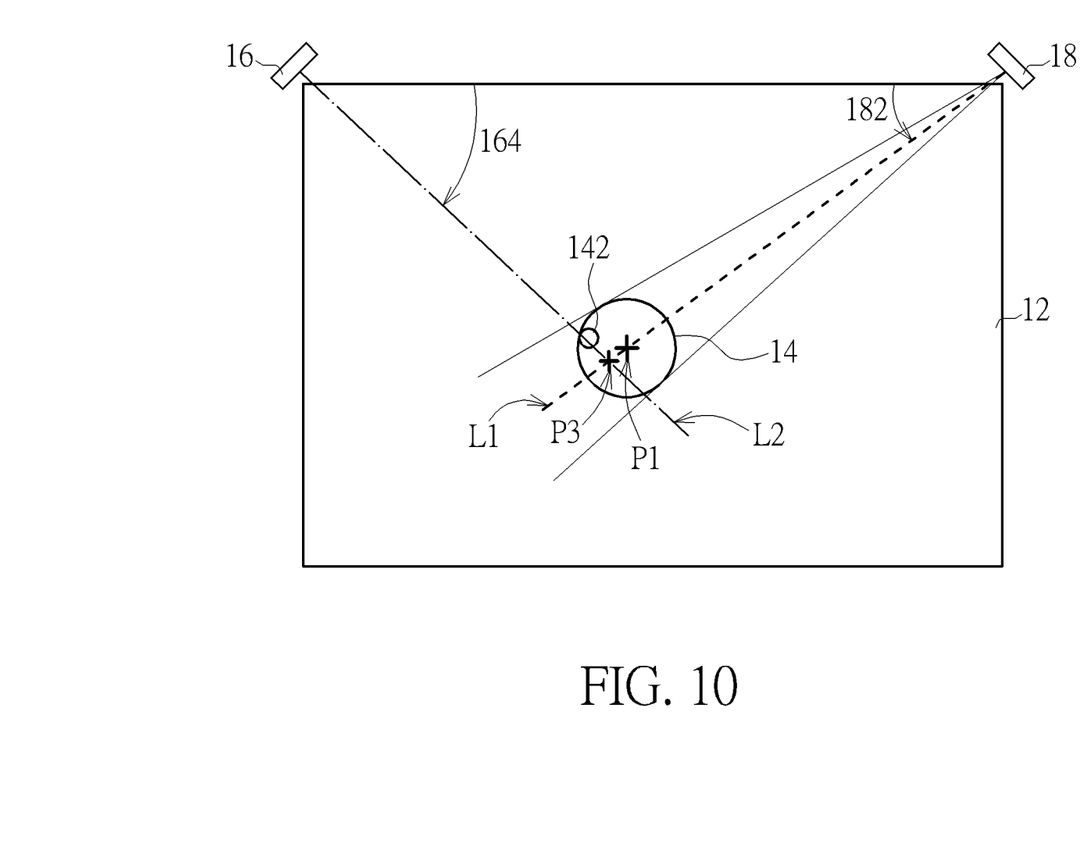
FIG. 10 is a schematic diagram illustrating the second optical sensor not sensing a light emitter.
Figure 11:
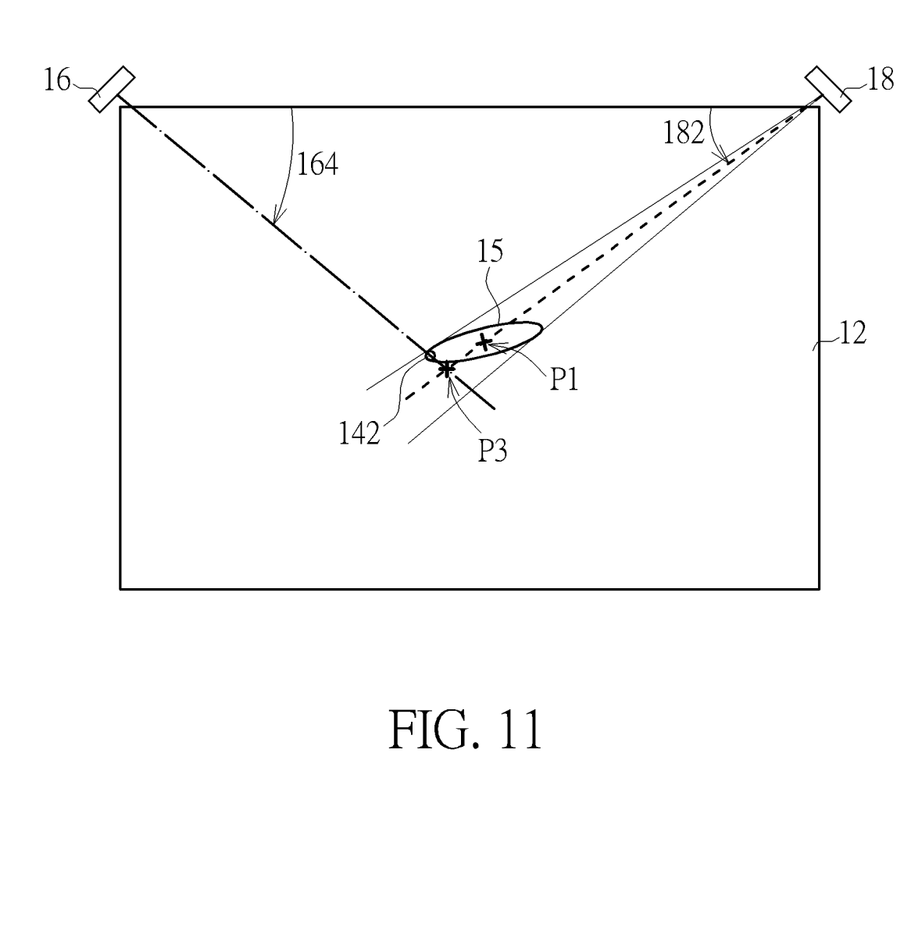
FIG. 11 is a schematic diagram illustrating a touch projection of a touch pen on a touch area according to an embodiment.

In above embodiments, the description of determining the light-emitting position P2 is based on FIG. 5. Therein, indication light emitted by the light emitter 142 can be sensed by both the first optical sensor 16 and the second optical sensor 18. However, in practice, maybe not all of the first optical sensor 16 and the second optical sensor 18 can directly sense the indication light. As shown by FIG. 10, an angle 164 (indicated by a chained line in FIG. 10) in which the first optical sensor 16 can sense the light emitter 142. Because the touch pen 14 produces a shading effect of a certain angle range (i.e. the angle by two thin solid lines in FIG. 10) to the second optical sensor 18, when the light emitter 142 enters the range, the second optical sensor 18 cannot sense the indication light emitted by the light emitter 142. At the moment, in the above step S140, the touch locating method includes defining a first reference line L1 (shown by a dashed line in FIG. 10) passing through the second optical sensor 18 and the center position P1 (indicated by a cross mark in FIG. 10), determining a second reference line L2 (i.e. the above chained line) passing through the first optical sensor 16 according to a receiving angle of the first optical sensor 16 receiving the indication light, and regarding an intersection P3 (also indicated by a cross mark in FIG. 10) of the first reference line L1 with the second reference line L2 as the light-emitting position of the light emitter 142. It is added that at the moment, because the light-emitting position is assumed by the intersection P3, not an actual location of the light emitter 142. There exists an error. Please also refer to FIG. 11. FIG. 11 is a schematic diagram illustrating a touch projection of a touch pen 15 on the touch area 12 according to an embodiment. The touch pen 15 is structurally similar to the touch pen 14 and will not be presented in a perspective view. The touch pen 15 has an elliptic touch profile on the touch area 12. For example, the front end portion of the touch pen 15 is formed in an elliptic column while the rest portion is still formed in a column for a user to grip. The light emitter 142 of the touch pen 15 is disposed on a surface corresponding to a long axis of an elliptic section. Thereby, the above error (i.e. the distance between the intersection P3 and the light emitter 142) can be reduced. In addition, the light emitter 142 protrudes slightly the surface of the touch pen 14 or 34, leading to reducing the above shading angle range, which is also conducive to reduction the above error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch locating method for locating a touch position and a touch direction of an indication object on a touch area of an optical touch system, the indication object having an outer surface and a light emitter disposed on a side of the outer surface, the optical touch system comprising a first optical sensor and a second optical sensor disposed at a circumference of the touch area, the touch locating method comprising the following steps:

(a) the first optical sensor and the second optical sensor sensing the indication object to determine a center position of the indication object on the touch area by an optical location means;
   (b) the light emitter emitting an indication light out of the outer surface;
   (c) the first optical sensor and the second optical sensor receiving the indication light so as to determine a light-emitting position of the light emitter on the touch area, wherein the light-emitting position is distinct from and around the center position; and
   (d) determining the touch position according to the center position and determining the touch direction according to a relative relationship between the center position and the light-emitting position.

2. The touch locating method of claim 1, wherein the step (d) is implemented by the following step:
   determining a vector according to the relative relationship between the center position and the light-emitting position, wherein the vector is from the center position to the light-emitting position, a direction of the vector is regarded as the touch direction, and the center position is regarded as the touch position.

3. The touch locating method of claim 1, wherein in the step (c), when the first optical sensor receives the indication light and the second optical sensor does not receive the indication light, the step (c) is implemented by the following step:
   defining a first reference line passing through the second optical sensor and the center position;
   determining a second reference line passing through the first optical sensor according to a receiving angle in which the first optical sensor receives the indication light; and
   regarding an intersection of the first reference line with the second reference line as the light-emitting position.

4. The touch locating method of claim 1, the optical touch system comprising a light generation module, wherein the optical location means is determining two angles of the indication object relative to the first optical sensor and the second optical sensor respectively according to light shading by the indication object, and the step (a) is implemented by the following steps:
   controlling the light generation module to emit background light;
   disenabling the light emitter;
   using the first optical sensor and the second optical sensor to sense the background light shaded by the indication object to generate a first shading light signal and a second shading light signal relative to the indication object respectively; and
   determining the center position according to the first shading light signal and the second shading light signal.

5. The touch locating method of claim 4, wherein the step (b) further comprises controlling the light generation module for disenabling the background light.

6. The touch locating method of claim 5, further comprising the following steps:
   controlling the light generation module to periodically generate the background light in a frequency; and
   controlling the light emitter to emit the indication light alternating with the light generation module.

7. The touch locating method of claim 1, the optical touch system comprising a light generation module for generating background light, wherein in the step (b), a wavelength of the indication light emitted by the light emitter is different to a wavelength of the background light, and in the step (a), the optical location means is determining two angles of the indication object relative to the first optical sensor and the second optical sensor respectively by the indication object shading the background light, so as to determine the center position of the indication object on the touch area.

8. The touch locating method of claim 1, the outer surface of the indication object comprising a reflective area, the optical touch system comprising a light generation module, wherein the optical location means is determining two angles of the indication object relative to the first optical sensor and the second optical sensor respectively according to light reflected by the indication object, and the step (a) is implemented by the following steps:
controlling the light generation module to generate detection light;
making the light emitter emit the indication light out of the outer surface;
using the first optical sensor and the second optical sensor to sense the indication light and the detection light reflected from the reflective area to generate a first reflected light signal and a second reflected light signal relative to the indication object respectively; and
determining the center position according to the first reflected light signal and the second reflected light signal.

9. The touch locating method of claim 8, wherein the step (b) further comprises controlling the light generation module for disenabling the detection light.

10. The touch locating method of claim 9, further comprising controlling the light generation module to periodically generate the detection light in a frequency.

11. The touch locating method of claim 1, the outer surface of the indication object comprising a reflective area, the optical touch system comprising a light generation module for generating a detection light, wherein in the step (b), a wavelength of the indication light emitted by the light emitter is different to a wavelength of the detection light, and in the step (a), the optical location means is determining two angles of the indication object relative to the first optical sensor and the second optical sensor respectively by the reflective area reflecting the detection light, so as to determine the center position of the indication object on the touch area.

12. An optical touch system, comprising:
a touch area;
a touch pen for performing a touch operation on the touch area, the touch pen having an outer surface and a light emitter, the light emitter being configured to emit an indication light out of the outer surface and disposed on a side of the outer surface;
a first optical sensor disposed at a first corner of a circumference of the touch area;
a second optical sensor disposed at a second corner of the circumference; and
a processing module electrically connected to the first optical sensor and the second optical sensor, the processing module being configured to sense the indication light by using the first optical sensor and the second optical sensor to determine a center position of the touch pen on the touch area by an optical location means, receive the indication light by using the first optical sensor and the second optical sensor so as to determine a light-emitting position of the light emitter on the touch area, and determine a touch position according to the center position, and determine a touch direction of the touch pen on the touch area according to a relative relationship between the center position and the light-emitting position, wherein the light-emitting position is distinct from and around the center position.

13. The optical touch system of claim 12, further comprising a light generation module electrically connected to the processing module for generating background light from the circumference of the touch area toward the touch area, wherein the processing module disenables the light emitter, uses the first optical sensor and the second optical sensor to sense the background light shaded by the touch pen to generate a first shading light signal and a second shading light signal relative to the touch pen respectively, and determines the center position according to the first shading light signal and the second shading light signal.

14. The optical touch system of claim 13, wherein the processing module is connected in communication to the touch pen, and the processing module synchronously controls the light generation module and the light emitter to emit the background light and the indication light periodically and alternately in a frequency.

15. The optical touch system of claim 12, further comprising a light generation module electrically connected to the processing module for generating background light from the circumference of the touch area toward the touch area, wherein the indication light has a first wavelength, the background light has a second wavelength, the first wavelength is different to the second wavelength, the first optical sensor and the second optical sensor comprise a first optical filter and a second optical filter respectively, and the first optical filter and the second optical filter selectively transmit the indication light or the background light.

16. The optical touch system of claim 12, further comprising a light generation module electrically connected to the processing module for generating detection light from the circumference of the touch area, wherein the outer surface of the touch pen comprises a reflective area, and the processing module controls the light emitter to emit the indication light, uses the first optical sensor to sense the indication light and the detection light reflected from the reflective area to generate a first reflected light signal relative to the touch pen, uses the second optical sensor to sense the indication light and the detection light reflected from the reflective area to generate a second reflected light signal relative to the touch pen, and determines the center position according to the first reflected light signal and the second reflected light signal.

* * * * *